United States Patent [19]

Trouillet

[11] Patent Number: 4,515,495
[45] Date of Patent: May 7, 1985

[54] LINKING ARRANGEMENT FOR A SHAFT AND A FLY-WHEEL

[75] Inventor: Jean Trouillet, Fontaine-Valmont, Belgium

[73] Assignee: Jeumont-Schneider Corporation, Puteaux, France

[21] Appl. No.: 424,519

[22] Filed: Sep. 27, 1982

[30] Foreign Application Priority Data

Sep. 25, 1981 [FR] France ................. 81 18074

[51] Int. Cl.³ ............................................. F16B 00/00
[52] U.S. Cl. ..................................... 403/336; 403/337
[58] Field of Search ............... 403/335, 336, 337, 338, 403/355, 380, 294; 464/36, 147, 81

[56] References Cited

U.S. PATENT DOCUMENTS

| 1,368,574 | 2/1921 | Romney ................. 464/85 |
| 1,469,527 | 10/1923 | Ouderkirk . |
| 2,526,799 | 10/1950 | Braswell ................. 64/14 |
| 3,309,910 | 3/1967 | Zeunert et al. ............ 403/359 X |
| 3,525,238 | 8/1970 | Cruz ..................... 464/85 |
| 4,068,965 | 1/1978 | Lichti .................. 403/344 X |
| 4,219,286 | 8/1980 | Lindenthal ............. 403/355 X |

FOREIGN PATENT DOCUMENTS

| 306044 | 11/1917 | Fed. Rep. of Germany . |
| 705212 | 3/1941 | Fed. Rep. of Germany . |
| 2755131 | 6/1979 | Fed. Rep. of Germany . |
| 693932 | 9/1930 | France . |
| 1301601 | 7/1962 | France . |
| 2390630 | 12/1978 | France . |
| 2463322 | 2/1981 | France . |
| 150532 | 6/1955 | Sweden ................. 403/337 |
| 920385 | 3/1963 | United Kingdom . |
| 479895 | 11/1975 | U.S.S.R. .............. 403/355 |
| 665137 | 5/1979 | U.S.S.R. ............... 464/85 |

Primary Examiner—Richard J. Scanlan, Jr.
Attorney, Agent, or Firm—Rines and Rines Shapiro and Shapiro

[57] ABSTRACT

A linking arrangement for a shaft and a moving part, such as a fly-wheel, rotating about the same axis includes two coaxial rims fastened to the shaft and moving part, respectively, with radial notches situated on opposed surfaces of the rims that are fixed in contact with one another. The notches provide housings for a set of cylindrical pins so that rotary motion can be transmitted between the shaft and the moving part. Stress-relieving grooves are provided at the bottom portions of the notches so as to permit constant contact between the rims and between the notches and the pins regardless of differential expansion of components of the linking arrangement. A principal application of the linking arrangement is to connect a shaft to a fly-wheel or a shaft to a rotary pump impeller.

4 Claims, 3 Drawing Figures

LINKING ARRANGEMENT FOR A SHAFT AND A FLY-WHEEL

BACKGROUND OF THE INVENTION

The present invention pertains to an arrangement permitting linking of a shaft and a moving part which turns about to the same axis, such as a flywheel.

Linking arrangements which have been developed heretofore usually consist of cotters which are inserted into grooves situated upon a shaft, on one hand, and into the center-hole of the fly-wheel, on the other hand. These grooves are the source of certain forms of stress, which are usually rendered more intense by limited radii of movement. In particular, it is possible to cite shearing stress, whereby it becomes necessary to select costly materials with considerable strength, which nevertheless require strict monitoring during use of the previously cited linking arrangements.

Another measure developed heretofore consists of achieving linkage by means of two discs which are to be integral with the respective components cited heretofore, with oppositely situated surfaces of said discs containing radial grooves which interact in order to transmit motion. Nevertheless, it is difficult to produce discs of this type, and stress produced by the previously cited grooves tends to cause the discs to slide over one another. Furthermore, on account of the inherent effects of centrifugal force, complete contact between the two discs is not achieved, and stress is not evenly distributed among the grooves.

There is also a connecting arrangement of the type described within French Patent No. 2,463,322, consisting of two plates, whereby one plate contains magnets and the other plate is composed of a ferromagnetic material. In order to transmit torque, the aforementioned plates possess teeth positioned so that the corners of the shoulders can be used to form a torque control arrangement, as a result of magnetic adhesion power. On account of the level of torque which must be transmitted, it is not possible to make use of an arrangement of this type as a linking arrangement.

SUMMARY OF THE INVENTION

The purpose of the present invention is to overcome these difficulties by means of an arrangement whereby cotters can be eliminated, although consistent mechanical linkage is ensured. In accordance with the present invention, this particular arrangement consists of two coaxial rims with the same diameter which are respectively integral with the shaft and the rotary component, with oppositely situated surfaces containing radial cylindrical notches. Along the bottom portion and along its entire length, each notch contains a groove, and the notches are arranged so as to constitute housings for a set of cylindrical pins, which provide a means of transmitting rotary motion without producing significant axial stress between the shaft and the rotary moving part, which can be centered automatically.

This invention, as well as other purposes, advantages, and characteristics of the invention, can be more fully understood and more clearly explained in relation to the description furnished hereinafter, which is accompanied by pages of illustrations.

DESCRIPTION OF THE PREFERRED EMBODIMENTS

Figure 1:
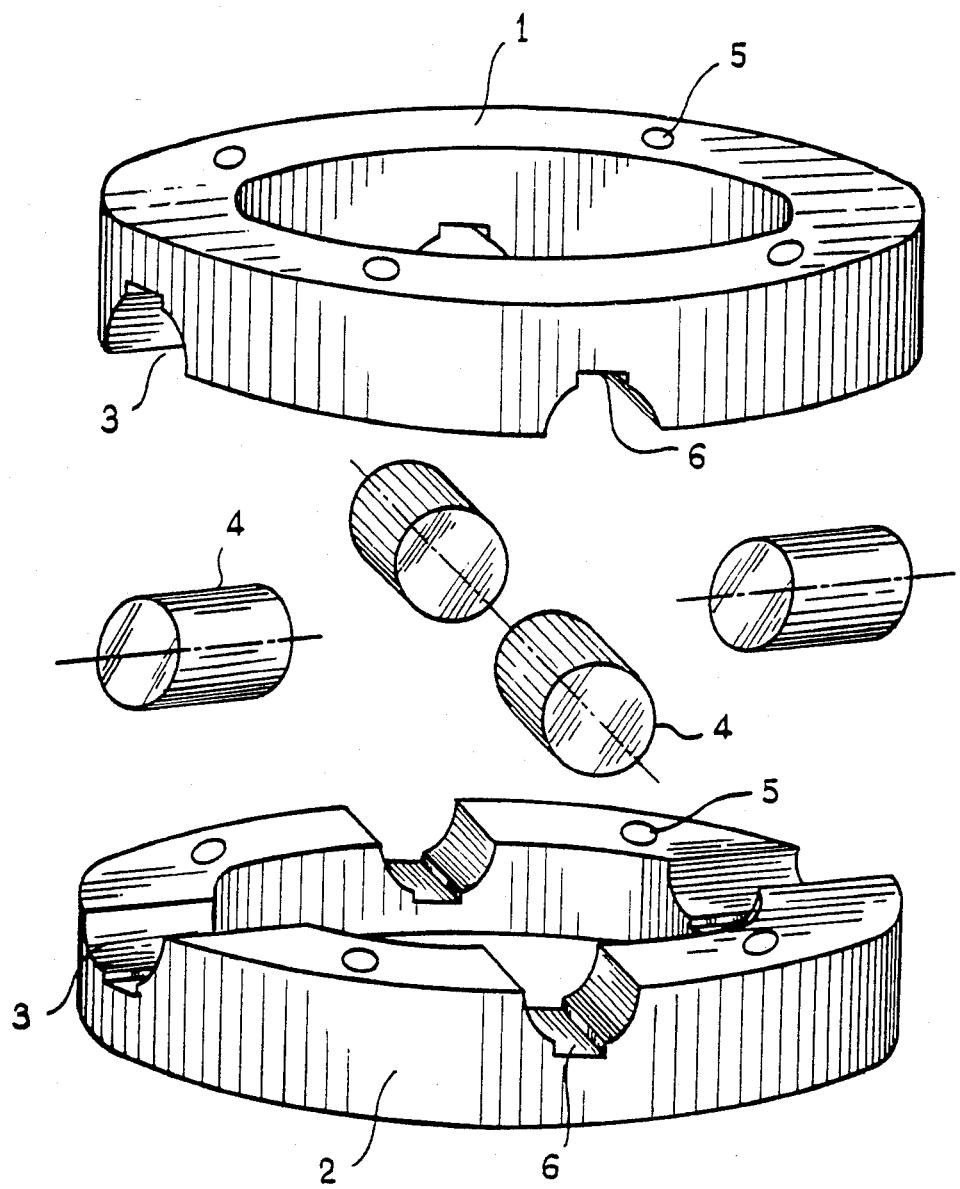
FIG. 1 is a cut-away representation of a disengaged linking arrangement in accordance with the invention.

In relation to FIG. 1, the linking arrangement essentially consists of two rims, 1 and 2, which are respectively joined to a shaft and a rotary moving part which do not appear in the drawing.

Obviously, the aforementioned rims can be integral parts of the shaft or the rotary moving part when such a measure is possible, or they can be separately produced and fastened to the shaft and the moving part at a subsequent point. The shaft, the two rims, and the rotary moving part are coaxial.

The oppositely situated surfaces of these rims contain radial notches, 3, with each notch comprising a housing for a cylindrical pin, 4, which is fitted to the diameter of said notches, 3. When the two rims, 1 and 2, are in contact, rotary motion is transmitted by means of these cylindrical pins, 4. The number of notches, 3, is determined by the torque which is to be transmitted. The radially positioned pins, 4, also offer the advantage of permitting consistent and complete centering between the aforementioned rims, 1 and 2.

Within the bottom portion of each of the notches cited heretofore, 3, a stress-relieving groove, 6, has been provided so as to permit symmetrical demarcation of two essentially equal portions with cylindrical surfaces, on both sides of the groove.

These stress-relieving grooves are of a minimal depth, so as not to increase tangential stress within the rims, 1 and 2. The purpose of these grooves is to minimize the axial component of torsional stress and to allow constant contact between the cylindrical pins, 4, and the previously cited notches, 3, regardless of differential expansion of any components.

Figure 2:
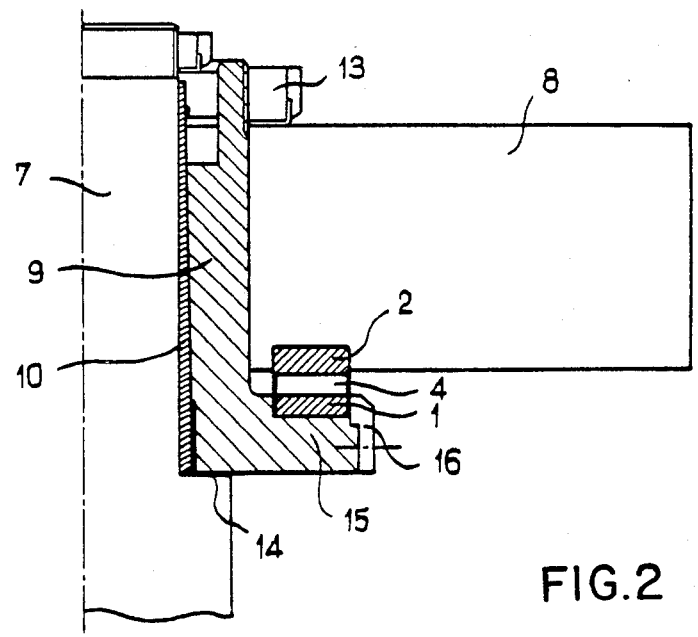
FIG. 2 furnishes a partial axial view of the same arrangement applied in order to link a shaft and an inertial fly-wheel.

Indeed, each cylindrical pin, 4, transmits a portion of tangential stress to the rim, 2, of the rotary moving part, transmitting said stress by means of a section of the cylindrical surface. The stress-relieving groove, 6, situated within each notch, 3, allows this section of the cylindrical surface to be situated near the area of contact for the two rims, 1 and 2, in such a manner that the axial component for the reactive power of the rim, 2, perpendicular to the surface, can be reduced. Moreover, when the moving part upon which one of the rims has been fastened is an inertial fly-wheel, as shown in FIG. 2, centrifugal force generated by turning of these components tends to apply uniform stress to said fly-wheel and to the rim fastened to the fly-wheel. The notch, 3, is equally deformed ovally.

As a result of reduction of cylindrical surface portions which are in contact along the sides of each notch, 3, permanent contact between the rims, 1 and 2, and the pins tends to be maintained. When deformation occurs, the pins, 4, slide radially along the notches, 3, situated on the expanding rim. Inasmuch as there is minimal deformation of the diameter of said notches, 3, in relation to the pins, the forms of stress transmitted by the cylindrical pins continue to be consistent.

Figure 3:
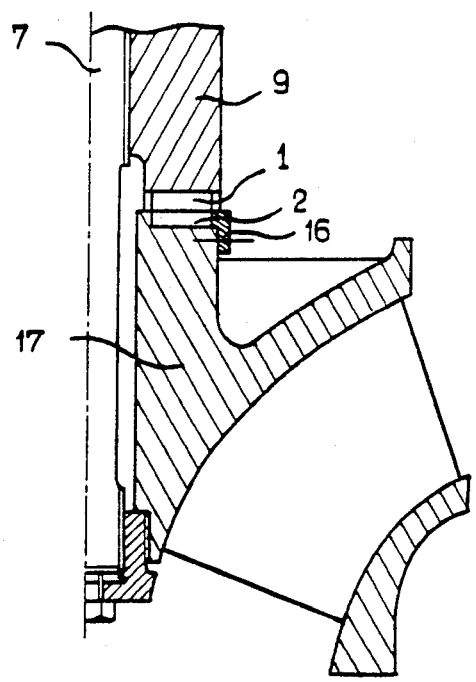
FIG. 3 furnishes a partial axial view of the same arrangement applied in order to link a shaft and a wheel on a pump.

A ring which is not shown in FIG. 1, but is identified as 16 within FIGS. 2 and 3, is fitted around the two rims in order to prevent the cylindrical pins, 4, from being ejected as a result of centrifugal force.

A linking arrangement of this type therefore provides the advantage of permitting expansion of one rim in relation to another, although this form of expansion does not affect the mechanical strength of the linkage. In addition, stress is transmitted by means of relatively large contact surfaces, instead of by simple straight lines, in contrast to arrangements composed of discs with radial grooves.

In reference to FIG. 2, where the previously cited arrangement provides linkage between a vertical shaft, 7, and a fly-wheel, 8, the rims, 1 and 2, have been machined beforehand and then respectively fastened to a ring, 15, and to a flat surface on the fly-wheel, 8, by means of embedding, for example. The ring, 15, protrudes from a bushing, 9, which is integral with the shaft, 7. The ring identified as 16 prevents the cylindrical pins, 4, from being ejected as a result of centrifugal force. This assembly is secured by means of a nut, 13, which counteracts axial stress which tends to separate the two rims, 1 and 2.

As can be observed, this arrangement is selfcentering on account of the radially situated pins.

In reference to FIG. 3, which provides a partial axial view of a pump, the wheel, 17, is attached to the shaft, 7, by means of a linking arrangement in accordance with the present invention, wherein a bushing, 9, may be an integral part of said shaft. The rim identified as 1 is integral with the bushing, 9, whereas the rim identified as 2 is integral with the wheel, 7, and the cylindrical pins, 4, are secured by means of a ring, 16.

The entire arrangement is held together by means of a nut, 13, which counteracts axial stress which tends to separate the two rims. This arrangement functions precisely in the manner described heretofore.

Although only certain versions of the present invention have been described in a non-restrictive form, it is obvious that any modifications introduced within the same context by technically knowledgeable persons would not represent departures from the intent of this invention. In this regard, it is possible to provide stress-relieving grooves on the cylindrical pins, 4, instead of within the previously cited notches, 3, while the cylindrical contact surfaces would be the same surfaces indicated for the previously described version of the invention.

I claim:

1. A linking arrangement for a shaft and a moving part rotatable about the same axis, comprising two rigid coaxial rims having the same diameter and which are respectively fastened to the shaft and the moving part with opposed surfaces of the coaxial rims fixed in contact with one another and having radial cylindrical notches therein containing respective cylindrical pins which fit the cylindrical notches when the rims are fixed in contact with one another, there being stress-relieving grooves along the entire length of the notches so as to define, for each notch, two essentially equal cylindrical surface portions at opposite sides of each groove, whereby rotary motion can be transmitted between the shaft and the moving part without producing significant axial stress therebetween as a result of torsion and while maintaining constant contact between the opposed surfaces of the rims regardless of differential expansion which may affect either rim.

2. An arrangement in accordance with claim 1, wherein each rim has substantially uniform thickness in the direction of said axis throughout its circumferential extent except where the notches are located.

3. An arrangement in accordance with claim 2, wherein the rims have annular surfaces parallel to and remote from the aforementioned surfaces, said annular surfaces engaging a pair of annular means for holding said opposed surfaces in contact with one another.

4. An arrangement in accordance with claim 3, wherein one of said annular means comprises a bushing fixed to the shaft and the other of said annular means comprises said moving part.

* * * * *